(12) United States Patent
Hancock et al.

(10) Patent No.: US 6,685,225 B2
(45) Date of Patent: Feb. 3, 2004

(54) VEHICLE STEERING COLUMN RIDE DOWN APPARATUS

(75) Inventors: Michael Thomas Hancock, Coventry (GB); Seiichi Moriyama, Warwickshire (GB); Yuichiro Fukunaga, Warwickshire (JP); Yasuhisa Yamada, West Midlands (GB)

(73) Assignee: NSK Steering Systems Europe Limited, Nottinghamshire (GB)

( * ) Notice: Subject to any disclaimer, the term of this patent is extended or adjusted under 35 U.S.C. 154(b) by 1 day.

(21) Appl. No.: 09/953,938

(22) Filed: Sep. 18, 2001

(65) Prior Publication Data

US 2002/0033593 A1 Mar. 21, 2002

(30) Foreign Application Priority Data

Sep. 19, 2000 (GB) .............................. 0022963
Sep. 4, 2001 (GB) .............................. 0121384

(51) Int. Cl.$^7$ ................................................ A62D 1/19
(52) U.S. Cl. ...................... 280/777; 74/492; 280/779
(58) Field of Search ................................ 280/777, 775, 280/779; 74/492, 493

(56) References Cited

U.S. PATENT DOCUMENTS

| | | | |
|---|---|---|---|
| 3,769,851 A | | 11/1973 | Edme et al. ................ 74/492 |
| 4,786,076 A | * | 11/1988 | Wierschem ................ 280/777 |
| 5,131,286 A | | 7/1992 | Sturges et al. .............. 74/492 |
| 5,181,435 A | * | 1/1993 | Khalifa et al. .............. 280/777 |
| 5,524,927 A | * | 6/1996 | Toussaint .................. 280/777 |
| 6,183,012 B1 | * | 2/2001 | Dufour et al. .............. 280/777 |
| 6,530,600 B1 | * | 3/2003 | Marxer et al. .............. 280/777 |

FOREIGN PATENT DOCUMENTS

| | | |
|---|---|---|
| DE | 699 01 366 T2 | 11/2002 |
| EP | 0 849 141 E PX | 6/1998 |
| WO | WO 99/61299 A1 | 12/1999 |

* cited by examiner

Primary Examiner—Eric Culbreth
(74) Attorney, Agent, or Firm—Miles & Stockbridge P.C.

(57) ABSTRACT

Vehicle steering column ride down apparatus to guide the direction of steering column collapse in the event of vehicle crash includes a first part for fixedly mounting to a support such as a cross car beam and a second part for coupling to a steering column assembly. At least one of the parts has one or more tracks to act as guides and the other part has structure that runs in the one or more tracks. The apparatus also includes a tightener to tighten the two parts, one upon the other, to provide a predetermined frictional resistance at least to initial relative break-away movement of the two parts in the event of vehicle crash. Each track may be constituted by at least one slot. Coated plates can be clamped between flanges of the parts, which are each in the form of brackets to provide further initial frictional resistance to the initial relative break-away movement of the two parts.

19 Claims, 2 Drawing Sheets

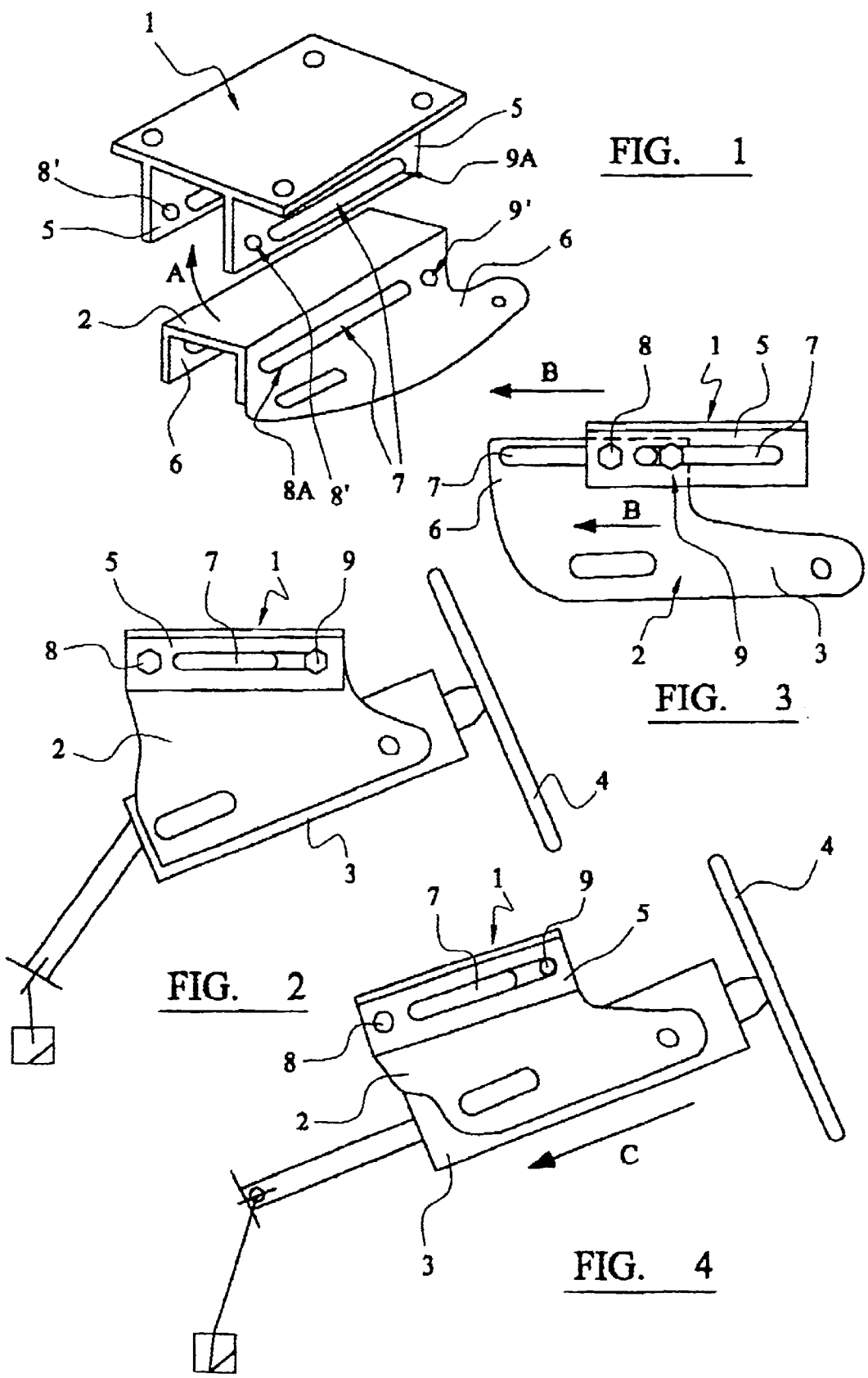

VEHICLE STEERING COLUMN RIDE DOWN APPARATUS

BACKGROUND OF THE INVENTION

This invention relates to a vehicle steering column ride down apparatus that aims to simplify known forms of such apparatus. Such ride down apparatus is incorporated in vehicle steering column assemblies in order to guide the direction of steering column collapse in the event of vehicle crash.

SUMMARY OF THE INVENTION

According to the present invention, there is provided a vehicle steering column ride down apparatus, comprising a first part for fixedly mounting to a support in the vehicle and a second part for coupling to a steering column assembly, at least one of the parts being tracked to act as a guidance and the other part having first means to run in the or each track and there being second means to tighten the two parts to provide a predetermined resistance at least to initial relative movement of the two parts in the event of vehicle crash.

The first part may be a fixed mounting bracket and may be provided with two parallel flanges, each with a longitudinal slot forming tracks in which said first means can run.

The second part may form a steering column support bracket and may be sized to fit within the two parallel flanges of the first part.

The second part may also be provided with two parallel flanges, each with longitudinal slots therein to form tracks in which the first means can run.

The first means can be formed by at least one screw fitting between the two parts. There may be at least one screw fitted in a screw aperture in the first part and tracking in one of the slots of the second part and there may be at least one screw in a screw aperture of the second part tracking in one of the slots of the first part.

The first means and the second means can be one and the same means.

Nuts may be tightened on the or each screw to provide the required torque for said predetermined resistance to relative movement of the two parts in the event of vehicle crash.

When the two parts are fitted one within the other, slots of adjacent flanges align with one another.

The invention also extends to a vehicle steering column assembly incorporating a steering column ride down apparatus essentially as defined above.

BRIEF DESCRIPTION OF THE DRAWINGS

For a better understanding of the invention and to show how the same may be carried into effect, reference will now be made, by way of example, to the accompanying drawings, in which:

FIG. 1 is a diagrammatic exploded perspective view of part of a vehicle steering column ride down apparatus;

FIG. 2 is a diagrammatic side view of the apparatus shown in FIG. 1, shown in an installed condition on a vehicle steering column assembly;

FIG. 3 is a diagrammatic side view of the apparatus and assembly shown in FIG. 2 showing the condition of the apparatus after a vehicle crash;

FIG. 4 is a view similar to FIG. 2 but illustrating a form of mounting where movement of the steering column assembly during vehicle crash takes place axially of the main steering column i.e. at an acute angle to the column axis, rather than horizontally, as is the case with FIG. 2.

DESCRIPTION OF THE PREFERRED EMBODIMENT

Figure 5:
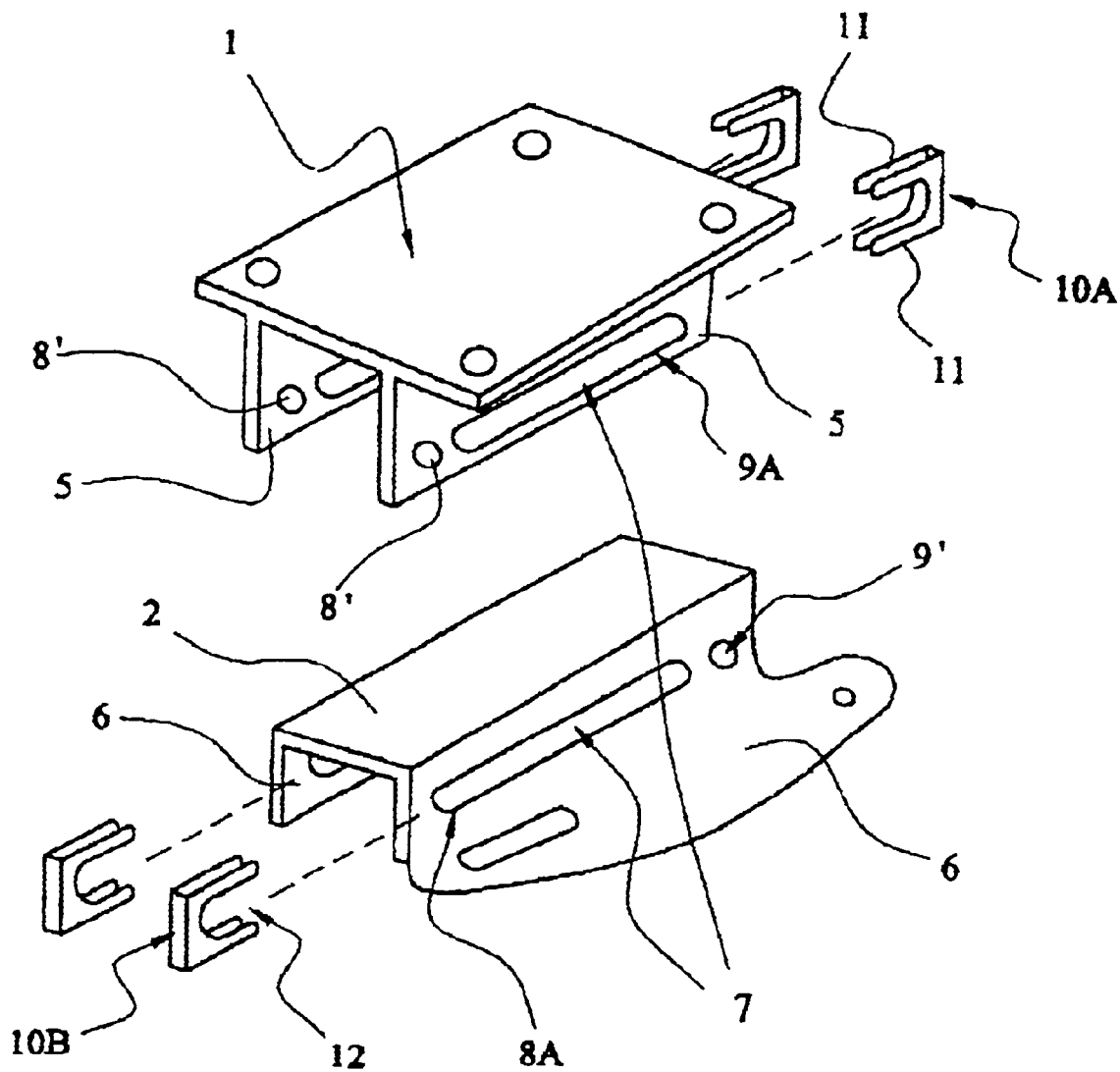
FIG. 5 is a view similar to FIG. 1 and shows a modification.

The Figures show a first part in the form of a fixed mounting bracket 1 for fixedly mounting to a support bracket such as a car cross beam (not shown) and a second part in the form of a steering column bracket 2 for coupling to a steering column assembly 3. A steering wheel 4 is also diagrammatically illustrated in FIGS. 2 and 4.

The mounting bracket 1 has two depending parallel flanges 5 and the steering column bracket 2 is of basic channel section with two resulting parallel side flanges 6, that are designed to fit within the two flanges 5 of the bracket 1 (see arrow A in FIG. 1).

Both the bracket 1 and the bracket 2 are provided with closed guide slots 7 in their side flanges 5, 6 respectively. Bolt or screw connections 8, 9 are provided that are screwed into screw apertures 8', 9' in the brackets 1, 2 respectively and are fitted so that they pass into the slots 7 of the adjacent brackets, fitting in the locations 8A, 9A respectively as shown in FIG. 1. Each screw is tightened to a predetermined torque to hold the brackets relatively fixed during normal vehicle use.

The mounting bracket 1, being fixed to a support in the vehicle such as a vehicle cross car beam, will allow the steering column bracket 2 to break away in the event of vehicle crash from the mounting points formed by the screws 8 and 9 which have been tightened to their preset torque.

It will be noted that in the event of crash, the pairs of screws 8, 9, once they break away from their normally fixed positions by initially each overcoming its predetermined torque, run down their respective slots 7, the screws 8 being held captive in their mountings in the outer fixed bracket 1 and running in the two slots 7 in the inner, steering column bracket 2, whilst the screws 9 are held captive in their mountings in the inner, steering column bracket 2 running in the two slots 7 in the outer bracket 1, at most until both sets of screws reach the end of their respective slots (assuming that both sets of slots are of equal length).

The crash path of the collapsing steering column will therefore be guided by the slots 7 in a controlled horizontal path as indicated by the arrows B in FIG. 2 or parallel to the column axis as shown by the arrow C in FIG. 4. Once the original torque has been overcome, there is comparatively low friction resistance between the parts 1 and 2.

The modification shown in FIG. 5 includes a secondary device to further decrease a friction or resistance in comparison with the contact between the side flanges by providing initial increased friction or resistance to break-away. This device includes two coated plates 10A fitted to the end of the mounting bracket 1 that lies upstream of the direction of break-away movement of the steering column bracket 2. The coated plates 10A are fitted one to each side flange 5 of the mounting bracket 1.

Two further coated plates 10B are fitted to the end of the steering column bracket 2 that lies downstream of the direction of break-away movement of the steering column bracket 2. The coated plates 10B are fitted one to each side flange 6 of the steering column bracket 2.

Each coated plate 10A, 10B is given the form of a narrow U-shaped element of substantially rectangular configuration when viewed in side elevation. Two wings 11 of the element are spaced-apart sufficiently to be fitted about the thickness of its side flange 5, 6.

Each wing 11 of each coated plate 10A, 10B is given an open groove 12 to accommodate one of the screws or screw bolts 9 passing through the flanges 5, 6.

To provide the increased friction or resistance initially upon break-away in the event of vehicle crash, the coated plates 10A, 10B are clamped between the brackets 5 and 6. On break-away, the brackets 5, 6, which are non-coated for these purposes, move freely relatively to one another once the coated plates 10A, 10B have been disengaged. Accordingly, friction is reduced during full ride-down of the steering column in the event of vehicle crash.

When the steering column is ridden-down toward the arrow B of FIG. 3 without the coated plates, that is, in a state that the brackets 5 and 6 made of steel plates which are not subjected to surface treatment are secured by the bolts 8 and 9, there is caused a high friction therebetween. Therefore, the ride-down load is largely varied depending on the workmanship of the brackets 5 and 6 or the fastening torque of the bolts 8 and 9. On the other hand, since the coated plates 10A and 10B coated with a low friction member such as PTFE are interposed between the brackets 5 and 6, the friction is reduced and the variation of the ride-down load between the products is restrained. When the ride-down is commenced, the constant load has been generated until the coated plates 10A and 10B are disengaged from the brackets 5 and 6. But, once the coated plates 10A and 10B are disengaged, the clearance is generated between the brackets 5 and 6 by the thickness of the coated plates 10A and 10B, to thereby obtain the free ride-down.

It will be appreciated that the arrangement and number of coated plates 10A, 10B could be varied and altered. For example, the plates 10A could be fitted on the side flanges 6 and the plates 10B could be fitted on the side flanges 5 or all could be fitted on one or the other.

It will be appreciated that the present construction provides a low cost steering column crash path control device and a low friction mechanism with horizontal path control.

In use, there will also be resistance to steering column deflection in a vertical plane in the event of vehicle crash, whilst the screw connections will provide a variable break-away force.

Furthermore, the low friction referred to comes as a result of vertical bending forces during crash conditions.

The device is also independent of other vehicle installations and can be supplied as a compact package utilizing minimal space in the vehicle.

We claim:

1. A vehicle steering column ride down apparatus, comprising:
    a first part for fixedly mounting to a support in the vehicle;
    a second part for coupling to a steering column assembly,
    at least one of the parts having tracks to act as a guide and the other part having first means to run in said tracks; and
    second means to tighten the two parts to provide a predetermined resistance at least to initial relative movement of the two parts in the event of a vehicle crash,
    wherein said first part is a fixed mounting bracket provided with two parallel flanges, each with a longitudinal slot forming a said track in which said first means can run, and
    wherein a secondary device is provided to provide further initial increased resistance to initial relative movement of the two parts in the event of said vehicle crash, and
    wherein said secondary device includes two coated plates fitted to one end of the fixed mounting bracket.

2. An apparatus according to claim 1, wherein said second part forms a steering column support bracket.

3. An apparatus according to claim 2, wherein said secondary device includes two coated plates fitted to one end of the steering column support bracket.

4. An apparatus according to claim 3, wherein said steering column support bracket is provided with two parallel flanges, each with longitudinal slots therein to form tracks in which said first means can run and wherein the two coated plates that are fitted to the end of the steering column bracket are fitted one to each of said parallel flanges of the steering column support bracket.

5. An apparatus according to claim 3, wherein each said coated plate is clamped between said first and second parts to provide the increased resistance at least to initial relative movement of the two parts in the event of vehicle crash.

6. An apparatus according to claim 3, wherein each said coated plate is given the form of a U-shaped element of substantially rectangular configuration when viewed in side elevation.

7. An apparatus according to claim 6, wherein each said coated plate has two wings that are spaced-apart sufficiently to be fitted about the thickness of a respective side flange of the steering column bracket.

8. An apparatus according to claim 7, wherein each said wing of each said coated plate is given an open groove to accommodate at least one screw or screw bolt fitting between the two parts.

9. An apparatus according to claim 1, wherein said second part is sized to fit within the two parallel flanges of said first part.

10. An apparatus according to claim 1, wherein said second part is provided with two parallel flanges, each with longitudinal slots therein to form tracks in which said first means can run.

11. An apparatus according to claim 1, wherein said first means is formed by at least one screw fitting between the two parts.

12. An apparatus according to claim 1, wherein said second part is provided with two parallel flanges, each with longitudinal slots therein to form tracks in which said first means can run, wherein said first means is formed by at least one screw fitted in a screw aperture in said first part and tracks in one of the slots of said second part and wherein there is at least one said screw in a screw aperture of said second part tracking in one of the slots of said first part.

13. An apparatus according to claim 1, wherein said first means and said second means include a common member.

14. An apparatus according to claim 1, wherein said second part is sized to fit within the two parallel flanges of said first part and is provided with two parallel flanges, each with longitudinal slots therein to form tracks in which said first means can run, wherein, when said two parts are fitted one in the other, the slots of adjacent flanges align with one another.

15. An apparatus according to claim 1, wherein said two coated plates are fitted one to each of said parallel flanges.

16. An apparatus according to claim 1, wherein each said coated plate is given the form of a U-shaped element of substantially rectangular configuration when viewed in side elevation.

17. An apparatus according to claim 16, wherein each said coated plate has two wings that are spaced-apart sufficiently to be fitted about the thickness of a respective side flange of the fixed mounting bracket.

18. An apparatus according to claim 17, wherein each said wing of each said coated plate is given an open groove to accommodate at least one screw or screw bolt fitting between the two parts.

19. An apparatus according to claim 1, wherein each said coated plate is clamped between said first and second parts to provide the increased resistance at least to initial relative movement of the two parts in the event of vehicle crash.

* * * * *